United States Patent [19]

Steele

[11] Patent Number: 5,788,726
[45] Date of Patent: Aug. 4, 1998

[54] IN CHAMBER SYSTEM PROTECTORS

[75] Inventor: James R. Steele, Stillwater, Minn.

[73] Assignee: Dynamic Air, Inc., St. Paul, Minn.

[21] Appl. No.: 662,500

[22] Filed: Jun. 13, 1996

[51] Int. Cl.$^6$ .................................................. B01D 46/010
[52] U.S. Cl. .......................... 55/302; 55/495; 209/139.1
[58] Field of Search ........................... 55/498, 302, 495, 55/490, 508; 210/484, 315; 209/139.1, 146, 147, 148, 149, 150

[56] References Cited

U.S. PATENT DOCUMENTS

| | | | |
|---|---|---|---|
| D. 138,327 | 7/1944 | Smith | D58/4 |
| 1,197,622 | 9/1916 | Hallowell | 209/139.1 |
| 1,284,579 | 11/1918 | Brown . | |
| 1,885,104 | 11/1932 | Bates . | |
| 2,370,034 | 2/1945 | Haugland | 220/4 |
| 4,198,726 | 4/1980 | Ponell . | |
| 4,336,043 | 6/1982 | Aonuma et al. . | |
| 4,482,367 | 11/1984 | Howeth . | |
| 4,514,875 | 5/1985 | Comer . | |
| 4,767,427 | 8/1988 | Barabas et al. . | |
| 4,806,240 | 2/1989 | Giordano et al. | 210/232 |
| 4,848,990 | 7/1989 | Matsui . | |
| 4,955,996 | 9/1990 | Edwards et al. | 55/302 |
| 5,250,179 | 10/1993 | Spearman | 210/315 |
| 5,344,559 | 9/1994 | Ooijen . | |
| 5,409,512 | 4/1995 | Wilkerson et al. . | |

*Primary Examiner*—Jay H. Woo
*Assistant Examiner*—Robert Hopkins
*Attorney, Agent, or Firm*—Jacobson & Johnson

[57] ABSTRACT

A system for preventing a cartridge filter which is located inside the bin or hopper of a system from accidentally falling into the hopper because of failure of the operator to properly handle the cartridge filter during replacement of the cartridge filter with the system including a safety cage that is secured to the bin with the safety cage surrounding the cartridge filter and being spaced sufficiently far from the cartridge filter to permit free nonbinding removal and replacement of a filter cartridge while still permitting substantially unimpeded flow of air through the safety cage.

14 Claims, 3 Drawing Sheets

IN CHAMBER SYSTEM PROTECTORS

FIELD OF THE INVENTION

This invention relates generally to air filter systems and, more particularly, to improvements to in chamber cartridge filter systems that require periodic replacement of the cartridge filters.

BACKGROUND OF THE INVENTION

One of the difficulties encountered with conveying systems is that oftentimes the air within the system needs to be vented from the system. As the air within the system is full of particulates it is necessary to filter the air before venting the air to the atmosphere. Typically, a cartridge filter is positioned within the mixing or storage chamber of the system so that the dirty air must flow through the cartridge filter before exiting from the system. The filter system includes a cartridge adapter that has members thereon that engage with mating members on the interior of the cartridge filter. The adapter holds the cartridge filter thereto as a single unit to permit the cartridge filter to be removed and replaced as a single unit when the cartridge filter is spent The locking mechanisms for holding the cartridge adapter to the filter cartridge are extremely effective and actually make it difficult to remove a filter cartridge from the cartridge adapter which minimizes the chances of the cartridge filter falling into the bin. Thus it is very difficult and rare for the cartridge filter to accidentally fall off the cartridge filter adapter, however, in spite of the security of the attachment system occasionally operator error causes the cartridge filter to drop into the system. That is, the person who is replacing the cartridge filter removes the filter cartridge filter from the cartridge adapter and during the handling process might accidently drop the old or new cartridge filter into the bin. While the locking engagement between the cartridge adapter and the cartridge filter virtually assures that accidental release should not occur it has been discovered that the operator might through inattentiveness accidently drop the cartridge filter into the bin after he or she has removed the cartridge filter from the filter adapter. As the bins are usually quite deep it is difficult to fish the cartridge filter out of the bin. In addition the bin system might contain machinery that would be damaged if the cartridge filter fell in. While it is highly unlikely that the adapter would ever fall off the cartridge filter the present invention address an unexpected handling problem that can result in a cartridge filter falling into the bin. That is, the operator through inexperience or inattentiveness might accidently drop the filter cartridge into the opening in the bin. To overcome the problem with inattentive personnel the present invention provides a safety cage that prevents the operator from accidently dropping the cartridge filter into the bin and causing damage to the system yet permits the operator to readily remove and replace the filter cartridge.

BRIEF DESCRIPTION OF THE PRIOR ART

U.S. Pat. No. 4,336,043 shows filtration assembly with a closed housing mounted around a filter.

U.S. Pat. No. 4,848,990 shows a dust collector with the dust collector located outside of the hopper dryer.

U.S. Pat. No. 5,344,559 shows a filter cartridge.

U.S. Pat. No. 5,409,512 shows an air filtration system for capturing dust during sweeping operations.

U.S. Pat. No. 4,482,367 shows a self-cleaning air filter system wherein air filter is vibrated to to dislodge accumulated material.

U.S. Pat. No. 4,767,427 shows a cartridge filter mounting apparatus wherein a releasable clamping apparatus holds the filter within the system.

U.S. Pat. No. 4,514,875 shows a filter for a cleaning machine with the filter mounted directly in the machine.

U.S. Pat. No. 4,198,726 shows cleaning filters mounted on a track.

U.S. Pat. No. 2,370,034 shows a removable bin for holding frozen foods in a refrigerator or the like.

U.S. Pat. No. 1,284,579 shows a jar and bottle holder.

U.S. Pat. No. De. 138,327 shows an ornamental basket.

U.S. Pat. No. 1,885,104 shows a basket for use in a refrigerator.

SUMMARY OF THE INVENTION

The present invention comprises a system for preventing a cartridge filter which is located inside the bin or hopper of a system from accidentally falling into the hopper because of failure of the operator to properly handle the cartridge filter during replacement of the cartridge filter with the system including a safety cage that is secured to the bin with the safety cage surrounding the cartridge filter and being spaced sufficiently far from the cartridge filter to permit free non-binding removal and replacement of a filter cartridge while still permitting substantially unimpeded flow of air through the safety cage.

DESCRIPTION OF THE PREFERRED EMBODIMENT

Figure 1:
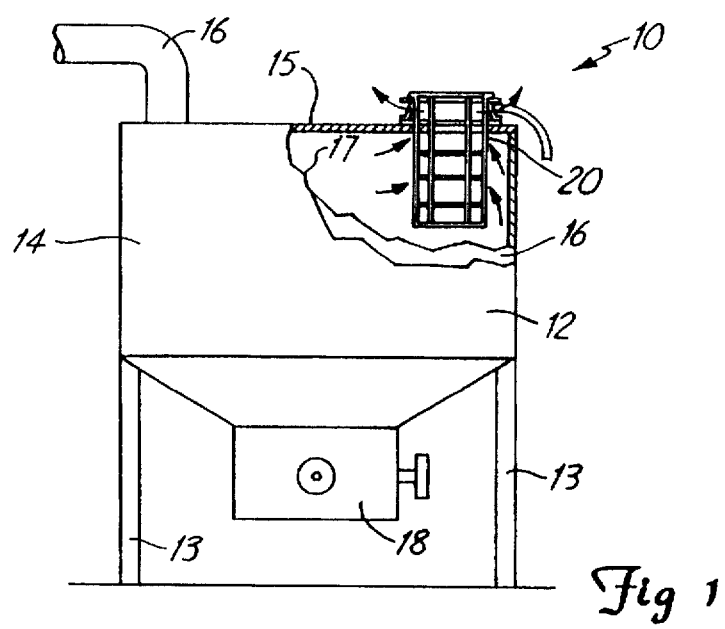
FIG. 1 shows a partial cut away view of a conveying system having a bin with a filter located internal to the bin for venting air to the outside of the bin.

FIG. 1 shows a partial cut away view of a conveying system 10 having a bin 12 with a filter 20 located internal to the bin 12 for venting air to the outside of the bin 12. Bin 12 sits on the floor supported by legs 13 and includes sidewalls and a top member 15. A discharge tube 16 connects to top member 15 to convey material to or from bin 12. Bin 12 includes a mixing mechanism 18 for mixing the material 16 in bin 12.

In operation of bin system 10, air from inside region 17 flows through filter 20 and is discharged to the atmosphere as indicated by the arrows. The filter removes particulate matter from the air to avoid polluting the air outside bin 12.

Figure 2:
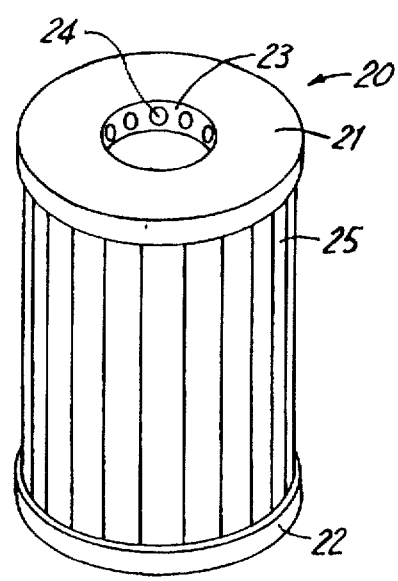
FIG. 2 shows a cartridge filter for use in the filter system of FIG. 1.

FIG. 2 shows a perspective view of a typical filter cartridge for use in the present system the cartridge includes a first rigid end cap 21 having a central member 23 with a set of engagement members spaced circumferentially around central member 23. A second end cap 22 is located on the opposite end of filter 20 and is secured to one end of filter media 25. Similarly end cap 21 is secured to the opposite end of filter media 25 to provide a filter cartridge. End cap 21 differs from end cap 22 in that end cap 22 is closed so that air can only enter the interior of filter 20 through the filter media 25.

Figure 3:
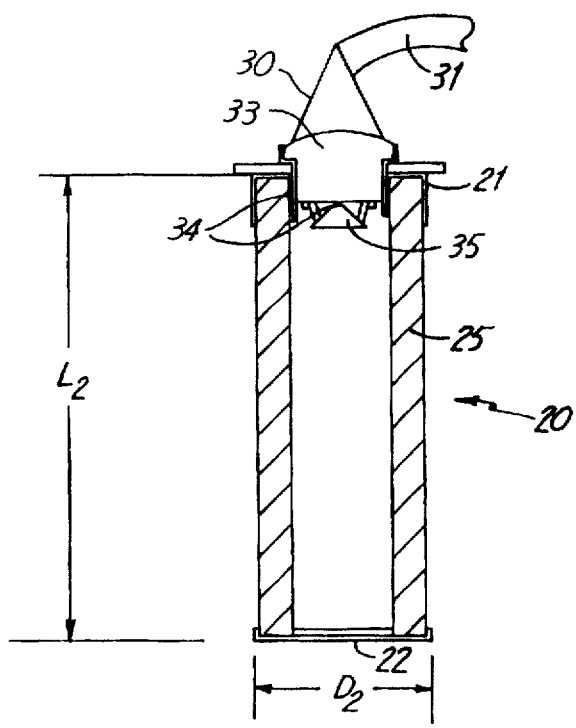
FIG. 3 shows a cartridge filter of FIG. 2 in secured engagement to a cartridge filter adapter.

FIG. 3 shows a cartridge filter adapter 30 having a set of cartridge engagement members 34 located on the cylindrical section 33 of filter adapter. A tube 31 attaches to filter adapter 30 to permit a user to periodically pulse air backward through filter cartridge 20 to dislodge particulate material that lodges on the filter media 25.

Cylindrical section 33 fits within the central member 20 in rigid end cap 21 so that the radial extending engagement members 34 engage the radial engagement members 24 on radial filter 20. To secure the adapter 30 to filter cartridge 20 one rotates or twists filter cartridge 20 slightly until the engagement members lock together in the form of threadlike engagement Once in engagement with each other the engagement members securely hold the adapter and the filter as a single unit.

Figure 4:
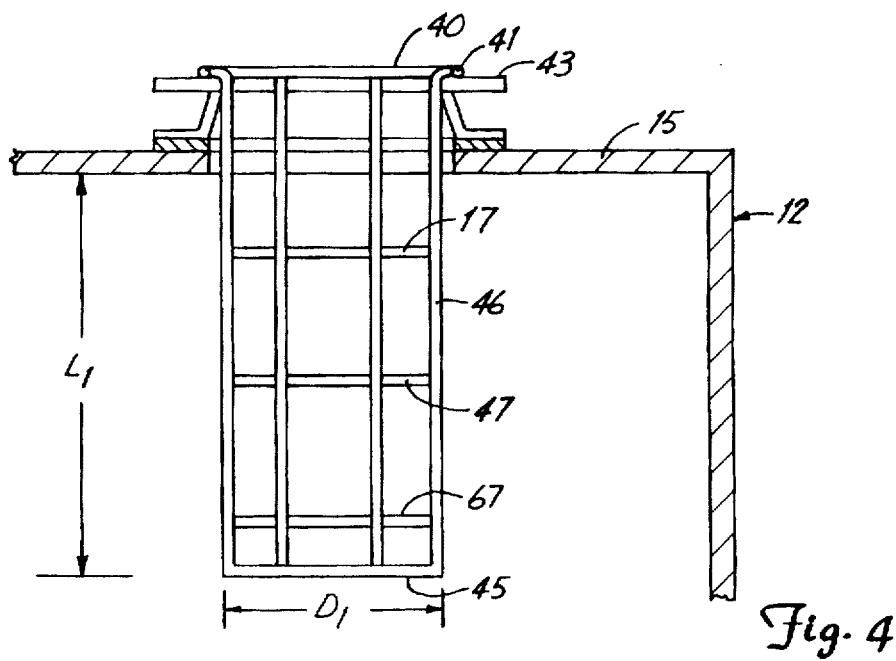
FIG. 4 shows the safety cage located inside the bin of the conveying system of FIG. 1.

FIG. 4 shows a top mounted cartridge case 40 having a lip 41 for circumferentially engaging a flange 43 to prevent cylindrical cartridge case 40 from falling into bin 12.

Flange 43 can be secured to top member 15 through a weldment or through bolts or rivets. The cartridge case includes bottom section 45 and a side section 46. Cartridge case 40 has an inside diameter $D_1$ and an inside length $L_1$ with the cartridge case 40 extending inside of bin 12. Cartridge case 40 includes a plurality of circumferential rings or bands 47 and a plurality of longitudinal wire members 46 that are secured to each other to form a wire safety cage 40 to surround a cartridge filter. The openings in the wire safety cage 40 are sufficiently large so as not to impede or restrict the flow of air through the filter. If the safety cage is to be used in a corrosive environment the wire safety cage can be made from stainless steel, however; other cage materials could be used depending on the environment in the bin. In the embodiment shown the wire safety cage is vertically mounted in bin 12, that is with the longitudinal members extending along or parallel to a vertical line.

FIG. 3 illustrates cylindrical cartridge filter 20 having an outside diameter $D_2$ and an outside length $L_2$ with the outside diameter sufficiently smaller than the inside diameter $D_1$ of cylindrical cartridge case 40 and the outside length $L_2$ of cartridge filter 20 being sufficiently smaller than the inside length $L_1$ of cylindrical cartridge 20 so as to permit free non binding insertion or removal of cartridge filter 20 from cylindrical cartridge case 40 while allowing the cylindrical cartridge case to prevent the cartridge filter 20 from accidently falling into bin 12 in the event the cartridge filter adapter 30 is disengaged from cartridge filter 20 during the changing of the cartridge filter 20 in the bin system 10.

Figure 5:
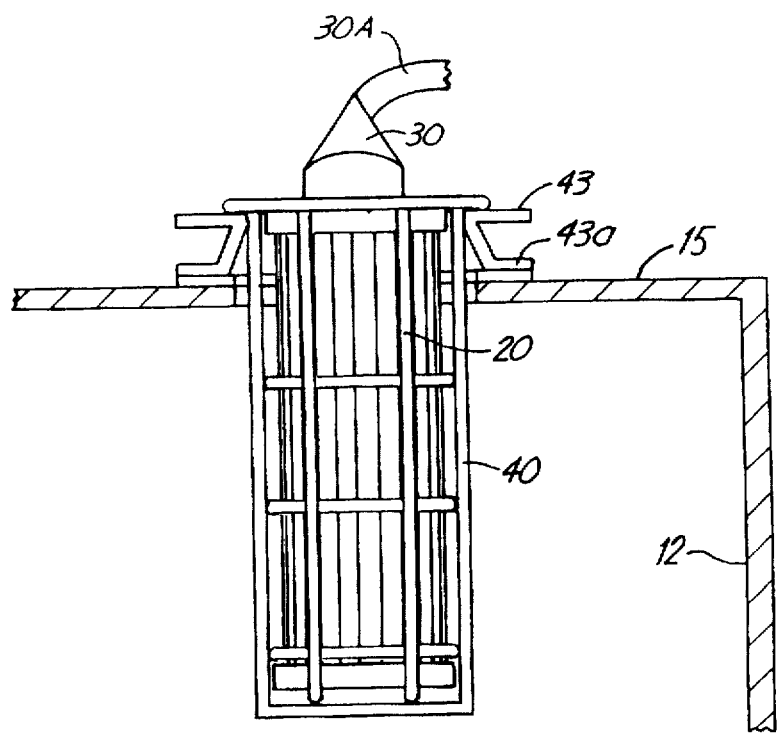
FIG. 5 shows the safety cage positioned around the cartridge filter to prevent a cartridge filter from ever falling into the bin.

FIG. 5 shows the filter 20 and filter adapter 30 located in safety cage 40 with the safety cage spaced from the sides and end wall of filter cartridge 20. In this condition the filter 20 cannot fall into bin 12; however, more importantly when an operator replaces the filter cartridge the safety cage 40 remains within bin 12 so that if the operator should accidently drop the filter cartridge it could not fall into the bin and damage the equipment in the bin.

I claim:

1. A pneumatic conveying system for storing or transporting material wherein air is used as a medium to transport materials within the pneumatic conveying system which results in the air in the conveying system containing particulate that needs to be removed therefrom before venting the air with a filtering of the air accomplished prior to venting the air from the pneumatic conveying system including:

a bin for holding material therein, said bin located in said pneumatic conveying system, said bin having sidewalls and a member for enclosing said side walls to define an inside and outside to said bin, said member having an opening therein for venting air from the inside of said bin to the outside of said bin;

a safety cage mounted on said bin, said safety cage having a bottom section, said safety cage having an inside diameter and an inside length forming a chamber therein with said safety cage located at least partially inside said bin, said safety cage supported by said bin and having a portion sufficiently large so as to prevent said safety cage from accidentally falling into said bin;

a cartridge filter adapter, said cartridge filter adapter having a cartridge engagement member therein;

a cartridge filter, said cartridge filter having a first closed end and a second end with filter material located therebetween, said cartridge filter including an engagement member on said second end forming locking engagement between said cartridge engagement member on said cartridge filter adapter and said cartridge filter engagement member to hold said cartridge filter and said cartridge filter adapter as a single unit, said cartridge filter having an outside diameter and an outside length with said outside diameter sufficiently smaller than said opening in said bin so that said cartridge can fall into said bin if not supported by said cartridge filter adapter in the event said cartridge filter became unlocked from said engagement member, said cartridge filter outside diameter sufficiently smaller than said inside diameter of said safety cage and said outside length of said cartridge filter being sufficiently smaller than said inside length of said safety cage so as to permit free, non-binding insertion or removal of said cartridge filter from said safety cage with said safety cage having an opening therein with the openings sufficiently small to prevent the cartridge filter from accidentally falling into said bin in the event the cartridge filter adapter becomes disengaged from said cartridge filter during the changing of the cartridge filter in the bin and the openings sufficiently large so as not to impede the flow of air through said safety cage.

2. The pneumatic conveying system of claim 1 wherein said safety cage and said cartridge filter are cylindrical.

3. The pneumatic conveying system of claim 2 wherein said safety cage is a wire cage.

4. The pneumatic conveying system of claim 3 wherein said cartridge filter adapter includes a passage for pulsing cleaning air through said cartridge filter to remove particles accumulated on said cartridge filter.

5. The pneumatic conveying system of claim 4 wherein the sufficiently large openings therein are spaced circumferentially around said safety cage.

6. The pneumatic conveying system of claim 5 wherein said member having an opening therein comprises a top member with said top member located above material processing equipment.

7. The pneumatic conveying system of claim 6 wherein said cartridge engagement member comprises radial extending members for forming twisting engagement with said cartridge filter.

8. The pneumatic conveying system of claim 1 wherein said adapter includes a passage therein for directing air into the cartridge to remove particles adhering to said filter by pulsing air into said cartridge filter to force accumulated particles from the cartridge filter and through the safety cage.

9. The pneumatic conveying system of claim 8 wherein said safety cage comprises a plurality of cylindrical rings serially spaced along said cage.

10. The pneumatic conveying system of claim 9 wherein said safety cage includes a plurality of longitudinal members intersecting said plurality of cylindrical rings to form an open structure for passage of unfiltered air there through.

11. The pneumatic conveying system of claim 10 wherein said safety cage is stainless steel.

12. The pneumatic conveying system of claim 10 wherein a flange is secured to said top member for supporting said safety cage therein.

13. The pneumatic conveying system of claim 12 wherein said safety cage is vertically mounted in said bin.

14. The pneumatic conveying system of claim 13 wherein said top member includes a lip for engaging said safety cage.

* * * * *